US009100920B2

(12) United States Patent
Liu et al.

(10) Patent No.: US 9,100,920 B2
(45) Date of Patent: Aug. 4, 2015

(54) PARAMETER CONFIGURATION METHOD AND CONFIGURATION DEVICE FOR MOBILE TERMINAL

(75) Inventors: Dongsheng Liu, Shanghai (CN); Yu Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 13/422,062

(22) Filed: Mar. 16, 2012

(65) Prior Publication Data

US 2012/0238258 A1 Sep. 20, 2012

(30) Foreign Application Priority Data

Mar. 17, 2011 (CN) .......................... 2011 1 0064464

(51) Int. Cl.
*H04W 72/00* (2009.01)
*H04W 52/02* (2009.01)
*H04W 24/10* (2009.01)

(52) U.S. Cl.
CPC ...... *H04W 52/0254* (2013.01); *H04W 52/0229* (2013.01); *H04M 2250/10* (2013.01); *H04M 2250/12* (2013.01); *H04W 24/10* (2013.01); *Y02B 60/50* (2013.01)

(58) Field of Classification Search
CPC ..... H04W 24/02; H04W 36/24; H04W 36/30; H04W 24/10; H04W 40/16; H04W 48/04
USPC ...................... 455/418, 423, 426.2, 434, 466; 370/328–338; 709/208, 220; 379/1.03, 379/26.01
See application file for complete search history.

(56) References Cited

U.S. PATENT DOCUMENTS

| | | | |
|---|---|---|---|
| 4,841,561 A | 6/1989 | Hill | |
| 2003/0005112 A1* | 1/2003 | Krautkremer | ................. 709/224 |
| 2003/0055920 A1* | 3/2003 | Kakadia et al. | ............... 709/220 |
| 2006/0221807 A1* | 10/2006 | Fukuoka et al. | ............... 370/203 |

(Continued)

FOREIGN PATENT DOCUMENTS

| | | |
|---|---|---|
| CN | 1809218 A | 7/2006 |
| CN | 101668070 A | 3/2010 |

(Continued)

OTHER PUBLICATIONS

Search Report issued in corresponding Chinese Patent Application No. 2011100644645, dated Jan. 21, 2013.

*Primary Examiner* — Quan M Hua
(74) *Attorney, Agent, or Firm* — Brinks Gilson & Lione (57) ABSTRACT

Embodiments of the present invention disclose a parameter configuration method and a configuration device for a mobile terminal. A parameter configuration method for a mobile terminal includes: obtaining a current channel change rate; comparing the current channel change rate with a maximum channel change rate and a minimum channel change rate in each scenario respectively; determining a channel change rate range to which the current channel change rate belongs, and setting a scenario corresponding to the channel change rate range as a target scenario; and obtaining a parameter configuration value group corresponding to the channel change rate range in the target scenario according to a corresponding relationship between a preset parameter configuration value group and the channel change rate range, and configuring a corresponding parameter of each module of the mobile terminal by using each parameter configuration value of the parameter configuration value group.

8 Claims, 4 Drawing Sheets

(56) References Cited

U.S. PATENT DOCUMENTS

| | | | |
|---|---|---|---|
| 2008/0072299 A1* | 3/2008 | Reiher | 726/7 |
| 2008/0075182 A1* | 3/2008 | Hsieh et al. | 375/260 |
| 2009/0052518 A1* | 2/2009 | Iwagami | 375/240 |
| 2010/0330923 A1* | 12/2010 | Okino | 455/67.11 |
| 2011/0010444 A1 | 1/2011 | Everett et al. | |
| 2011/0044305 A1* | 2/2011 | Christoffersson et al. | 370/338 |

FOREIGN PATENT DOCUMENTS

| | | | |
|---|---|---|---|
| CN | 101981909 A | | 2/2011 |
| GB | WO2008093045 | * | 8/2008 |
| JP | 62225068 A | | 10/1987 |

* cited by examiner

PARAMETER CONFIGURATION METHOD AND CONFIGURATION DEVICE FOR MOBILE TERMINAL

CROSS-REFERENCE TO RELATED APPLICATIONS

This application claims priority to Chinese Patent Application No. 201110064464.5, filed on Mar. 17, 2011, which is hereby incorporated by reference in its entirety.

FIELD OF THE INVENTION

The present invention relates to the filed of communications technologies, and in particular, to a parameter configuration method and a configuration device for a mobile terminal.

BACKGROUND OF THE INVENTION

With the development of mobile communications technologies, the service rate of a mobile terminal is increased rapidly, from 384 kbps of the R99 service to 84 Mbps of the HSPA (High-Speed Packet Access, high-speed packet access)+. However, with the increase in the service rate, the baseband power consumption of the mobile terminal is increased sharply, working time shortens, and the case temperature rises to 30° C.-45° C., thereby increasing occurrence of risks in heat dissipation of the mobile terminal, and further influencing the stability of the mobile terminal.

Presently, about 30% of the baseband power consumption of the mobile terminal is from modules relevant to channel processing, for example, an equalization and demodulation module, a cell measurement module, and an adjacent cell interference cancellation module. However, each module of the mobile terminal is configured by a parameter configuration system of the mobile terminal according to a parameter configuration value group corresponding to a channel change rate range in a high-speed scenario in the design of the mobile terminal.

However, when each module in a mobile terminal, especially in a data card, is configured by adopting the parameter configuration value group corresponding to the channel change rate range in the high-speed scenario, the baseband power consumption is increased, the working time of the mobile terminal is reduced, and occurrence of risks in heat dissipation is increased.

SUMMARY OF THE INVENTION

In order to solve the above technical problems, embodiments of the present invention provide a parameter configuration method and a configuration device for a mobile terminal, so as to solve a problem that the baseband power consumption of the mobile terminal is increased, working time is reduced, and occurrence of risks in heat dissipation is increased, caused by a configuration manner that each module of a current mobile terminal adopts a parameter configuration value group corresponding to a maximum channel change rate in a high-speed scenario. The technical solutions are described below.

Based on an aspect of the present invention, an embodiment of the present invention provides a parameter configuration method for a mobile terminal, where the method includes:

obtaining a current channel change rate;

comparing the current channel change rate with a maximum channel change rate and a minimum channel change rate in each scenario respectively;

determining a channel change rate range to which the current channel change rate belongs, and setting a scenario corresponding to the channel change rate range as a target scenario; and according to a corresponding relationship between a preset parameter configuration value group and the channel change rate range, obtaining the parameter configuration value group corresponding to a channel change rate range in the target scenario, and configuring a corresponding parameter of each module of the mobile terminal by using each parameter configuration value of the parameter configuration value group.

Based on another aspect of the present invention, an embodiment of the present invention provides a parameter configuration device for a mobile terminal, where the device includes:

a channel rate obtaining module, configured to obtain a current channel change rate;

a rate comparison module, configured to compare the current channel change rate with a channel change rate and a minimum channel change rate in each scenario respectively;

a scenario determination module, configured to determine a channel change rate range to which the current channel change rate belongs, and set a scenario corresponding to the channel change rate range as a target scenario; and a parameter configuration module, configured to, according to a corresponding relationship between a preset parameter configuration value group and the channel change rate range, obtain the parameter configuration value group corresponding to the channel change rate range in the target scenario, and configure a corresponding parameter of each module of the mobile terminal by using each parameter configuration value of the parameter configuration value group.

Through application of the technical solutions, the channel change rate range to which the current channel change rate belongs is determined, a parameter configuration value group corresponding to the channel change rate range in the target scenario is obtained according to the corresponding relationship between the preset parameter configuration value group and the channel change rate range, and the corresponding parameter of each module of the mobile terminal is configured by using each parameter configuration value of the parameter configuration value group. Compared with the prior art that the corresponding parameter of each module of the mobile terminal is configured by using a parameter configuration value group corresponding to a channel change rate range in a high-speed scenario, baseband power consumption is reduced, working time is increased, and occurrence of risks in heat dissipation is lowered.

DETAILED DESCRIPTION OF THE EMBODIMENTS

The technical solutions of the embodiments of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative effects shall fall within the protection scope of the present invention.

An Embodiment

Through research, the inventor finds that currently each module in a mobile terminal, especially in a data card, is configured by using a parameter configuration value group corresponding to a maximum channel change rate in a high-speed scenario. That is to say, regardless that a scenario in which a mobile terminal is used is a high-speed scenario, a low-speed scenario, or a static scenario, the mobile terminal uses a fixed parameter configuration value group, that is, the parameter configuration value group corresponding to a channel change rate range in the high-speed scenario is used for configuration. Due to the mode, when the mobile terminal works in a low-speed scenario and a static scenario, baseband power consumption is increased, working time of the mobile terminal is reduced, and occurrence of risks in heat dissipation is increased.

Figure 1:
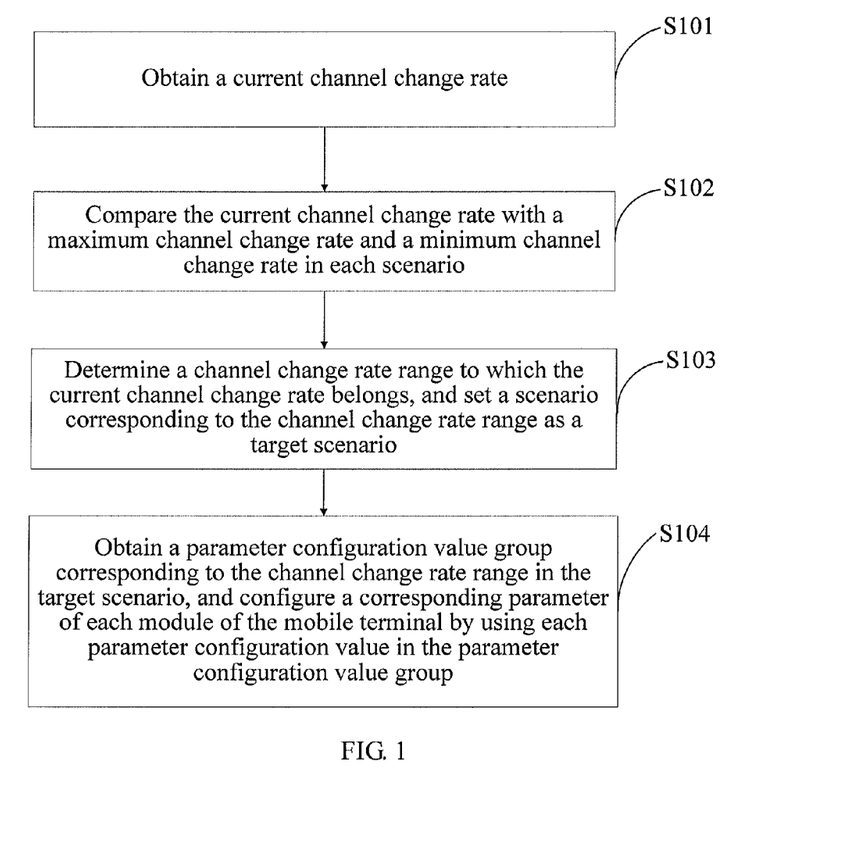
FIG. 1 is a flowchart of a parameter configuration method for a mobile terminal provided by an embodiment of the present invention.

In order to solve the above problems, an embodiment of the present invention provides a parameter configuration method for a mobile terminal, where a parameter configuration value group corresponding to a channel change rate in a current scenario in which a mobile terminal is, rather than a fixed parameter configuration value group corresponding to a maximum channel change rate range in a high-speed scenario, is used to configured each module of a mobile terminal, and the flowchart is shown in FIG. 1. The method includes the following steps.

S101: Obtain a current channel change rate, and specifically, obtain a movement speed of a current mobile terminal, where the movement speed of the mobile terminal is in a proportional relationship to the channel change rate, and after obtaining the movement speed, obtain the current channel change rate according to the relationship between the movement speed and the channel change rate.

A speed estimation module is disposed in the mobile terminal, and the speed estimation module obtains the current movement speed of the mobile terminal through an existing test method, for example, a signal processing method based on Doppler Effect or a GPS (Global Positioning System, global positioning system) speed measurement method or a system power mode identification method, and details are not described in the embodiment of the present invention.

S102: Compare the current channel change rate with a maximum channel change rate and a minimum channel change rate in each scenario respectively.

The scenario in which the mobile terminal is includes a static scenario, a low-speed scenario, and a high-speed scenario. Each scenario has a certain channel change rate range, including a maximum channel change rate and a minimum channel change rate. Scenarios are classified according to the maximum channel change rate or the minimum channel change rate. The maximum channel change rate of the static scenario may be equal to the minimum channel change rate of the low-speed scenario, and the maximum channel change rate of the low-speed scenario may be equal to the minimum channel change rate of the high-speed scenario.

S103: Determine a channel change rate range to which the current channel change rate belongs, and set a scenario corresponding to the channel change rate range as a target scenario.

When the current channel change rate is greater than the minimum channel change rate of the static scenario, and is less than the maximum channel change rate of the static scenario, it is determined that the current channel change rate is located in the channel change rate range of the static scenario, and the static scenario is set as a target scenario.

When the current channel change rate is greater than the minimum channel change rate of the low-speed scenario, and is less than the maximum channel change rate of the low-speed scenario, it is determined that the current channel change rate is located in the channel change rate range of the low-speed scenario, and the low-speed scenario is set as a target scenario.

When the current channel change rate is greater than the minimum channel change rate of the high-speed scenario, and is less than the maximum channel change rate of the high-speed scenario, it is determined that the current channel change rate is located in the channel change rate range of the high-speed scenario, and the high-speed scenario is set as a target scenario.

As the maximum channel change rate of the static scenario may be equal to the minimum channel change rate of the low-speed scenario, and the maximum channel change rate of the low-speed scenario may be equal to the minimum channel change rate of the high-speed scenario, when step S103 is performed, the current channel change rate may belong to two channel change rate ranges at the same time. For example, the current channel change rate belongs to the channel change rate range of the static scenario and the channel change rate range of the low-speed scenario at the same time, and in this case, the channel change rate range to which the current channel change rate belongs is determined based on the principle of optimal performance, that is, it is determined that the current channel change rate belongs to the channel change rate of the low-speed scenario, and the low-speed scenario is set as the target scenario, or the channel change rate range to which the current channel change rate belongs is determined based on the principle of minimum power consumption, that is, it is determined that the current channel change rate belongs to the channel change rate of the static scenario, and the static scenario is set as the target scenario.

When the current channel change rate belongs to the channel change rate range of the low-speed scenario and the channel change rate range of the high-speed scenario at the same time, it is determined that the current channel change rate belongs to the channel change rate of the high-speed scenario based on the principle of optimal performance, and the high-speed scenario is set as the target scenario, or the channel change rate range to which the current channel change rate belongs is determined based on the principle of minimum power consumption, that is, it is determined that the current channel change rate belongs to the channel change rate of the low-speed scenario, and the low-speed scenario is set as the target scenario.

S104: According to a corresponding relationship between a preset parameter configuration value group and the channel change rate range, obtain the parameter configuration value group corresponding to the channel change rate range in the target scenario, and configure a corresponding parameter of each module of the mobile terminal by using each parameter configuration value in the parameter configuration value group.

The parameter configuration value group is determined according to the obtained performance of the mobile terminal when an operator configures a different parameter for each module of the mobile terminal at a different channel change rate. After the scenario in which the mobile terminal is determined, a parameter configuration value group corresponding to the channel change rate range in the target scenario is obtained according to the corresponding relationship between the preset parameter configuration value group and the channel change rate range, and parameter configuration is performed on each module of the mobile terminal.

The parameter configuration method provided by the embodiment of the present invention may further obtain the parameter configuration value group of a current mobile terminal, and obtain a channel change rate range corresponding to the parameter configuration value group of the current mobile terminal as a previous channel change rate range according to a corresponding relationship between a preset parameter configuration value group and the channel change rate range.

A current channel change rate is compared with a previous channel change rate range. If it is judged that the current channel change rate is located in the previous channel change rate range, it indicates that the scenario in which the mobile terminal is does not change, and parameter configuration of each module of the mobile terminal is reserved. If it is judged that the current channel change rate is not located in the previous channel change rate range, it indicates that the scenario in which the mobile terminal is changes, and step S102 or step S104 is performed. By adopting the above solution, repeated configuration of each module in the mobile terminal can be further avoided when the scenario in which the mobile terminal is does not change.

In the following, taking a situation that the channel change rate range of the static scenario is 0-10 Km/h, the channel change rate range of the low-speed scenario is 10-50 Km/h, the channel change rate range of the high-speed scenario is 50-100 Km/h, and the relationship between the movement speed and the channel change rate is: channel change rate=movement speed*5 as an example, the application of the parameter configuration method for a mobile terminal is introduced.

Application Scenario 1

The movement speed of a current mobile terminal is 9 Km/h, and according to channel change rate=movement speed*5, the channel change rate of the current mobile terminal is 45 Km/h.

The current channel change rate 45 Km/h is compared with a maximum channel change rate and a minimum channel change rate in each scenario respectively, and if it is determined that the current channel change rate belongs to the channel change rate range of the low-speed scenario, the low-speed scenario is set as the target scenario in which the mobile terminal is. A parameter configuration value group corresponding to the channel change rate range in the low-speed scenario is obtained according to the corresponding relationship between the preset parameter configuration value group and the channel change rate range, and the corresponding parameter of each module of the mobile terminal is configured by using each parameter configuration value of the parameter configuration value group.

Definitely, in order to avoid repeated configuration of each module in the mobile terminal, before configuration, a parameter configuration value group of the current mobile terminal is further obtained, and according to the corresponding relationship between the preset parameter configuration value group and the channel change rate range, a channel change rate range corresponding to the parameter configuration value group of the current mobile terminal is obtained as a previous channel change rate range. It is assumed that, before configuration, if the mobile terminal adopts the parameter configuration value group corresponding to the channel change rate range in the low-speed scenario to configure each module, the previous channel change rate range obtained through the above steps is the channel change rate range in the low-speed scenario. The current channel change rate is compared with the previous channel change rate range, if it is determined that the current channel change rate is located in the previous channel change rate range, it indicates that the mobile terminal is still in the low-speed scenario, so the parameter configuration of each module of the mobile terminal is reserved.

It is assumed that, before configuration, if the mobile terminal adopts the parameter configuration value group corresponding to the channel change rate range in the high-speed scenario to configure each module, the previous channel change rate range obtained through the above steps is the channel change rate range of the low-speed scenario. The current channel change rate is compared with the previous channel change rate range, if it is determined that the current channel change rate is not located in the previous channel change rate range, it indicates that the scenario in which the mobile terminal is changes, and the mobile terminal is in the low-speed scenario at this time, parameter configuration of each module of the mobile terminal needs to be changed, that is, the parameter configuration value group corresponding to the channel change rate range in the low-speed scenario is used to configure each module.

Application Scenario 2

The movement speed of the current mobile terminal is 10 Km/h, and according to channel change rate=movement speed*5, the channel change rate of the current mobile terminal is 50 Km/h.

The current channel change rate 50 Km/h is compared with a maximum channel change rate and a minimum channel change rate in each scenario respectively, and if it is determined that the current channel change rate belongs to the channel change rate range of the low-speed scenario and the channel change rate range of the high-speed scenario at the same time, the high-speed scenario is set as the target scenario of the mobile terminal based on the principle of optimal performance—the principle of the fast channel data transfer rate. A parameter configuration value group corresponding to the channel change rate range in the high-speed scenario is obtained according to the corresponding relationship between the preset parameter configuration value group and the channel change rate range, and the corresponding parameter of each module of the mobile terminal is configured by using each parameter configuration value of the parameter configuration value group.

Application Scenario 3

The movement speed of the current mobile terminal is 2 Km/h, and according to channel change rate=movement speed*5, the channel change rate of the current mobile terminal is 10 Km/h.

The current channel change rate 10 Km/h is compared with a maximum channel change rate and a minimum channel change rate in each scenario respectively, and if it is determined the current channel change rate belongs to the channel change rate range of the static scenario and the channel change rate range of the low-speed scenario at the same time, the static scenario is set as the target scenario of the mobile terminal based on the principle of minimum power consumption, that is, the principle that each module in the mobile terminal consumes minimum power when the module runs. A parameter configuration value group corresponding to the channel change rate range in the static scenario is obtained according to the corresponding relationship between the preset parameter configuration value group and the channel change rate range, the corresponding parameter of each module of the mobile terminal is configured by using each parameter configuration value of the parameter configuration value group.

Technical staff generally call each of the static scenario and the low-speed scenario as a low-speed scenario, when scenarios include the low-speed scenario and the high-speed scenario, and similarly, processing is performed according to the implementation mode of the three application scenarios, so details are not described herein again.

Through application of the above technical solutions, the parameter configuration value group corresponding to the channel change rate range in the target scenario is obtained according to the corresponding relationship between the preset parameter configuration value group and the channel change rate range, and the corresponding parameter of each module of the mobile terminal is configured by using each parameter configuration value of the parameter configuration value group. Compared with the prior art that the corresponding parameter of each module of the mobile terminal is configured by using the parameter configuration value group corresponding to the channel change rate range in the high-speed scenario, the baseband power consumption is reduced, the working time is increased, and occurrence of risks in heat dissipation is lowered.

It is verified by the inventor through multiple experiments that, when each module of the mobile terminal is configured by adopting the above method, in the low-speed scenario, the equalized power consumption of key modules of the mobile terminal, for example, an equalization and demodulation module and an adjacent cell interference cancellation module can be at least reduced by 60%, and overall baseband power consumption can be at least reduced by 5%.

Another Embodiment

Figure 2:
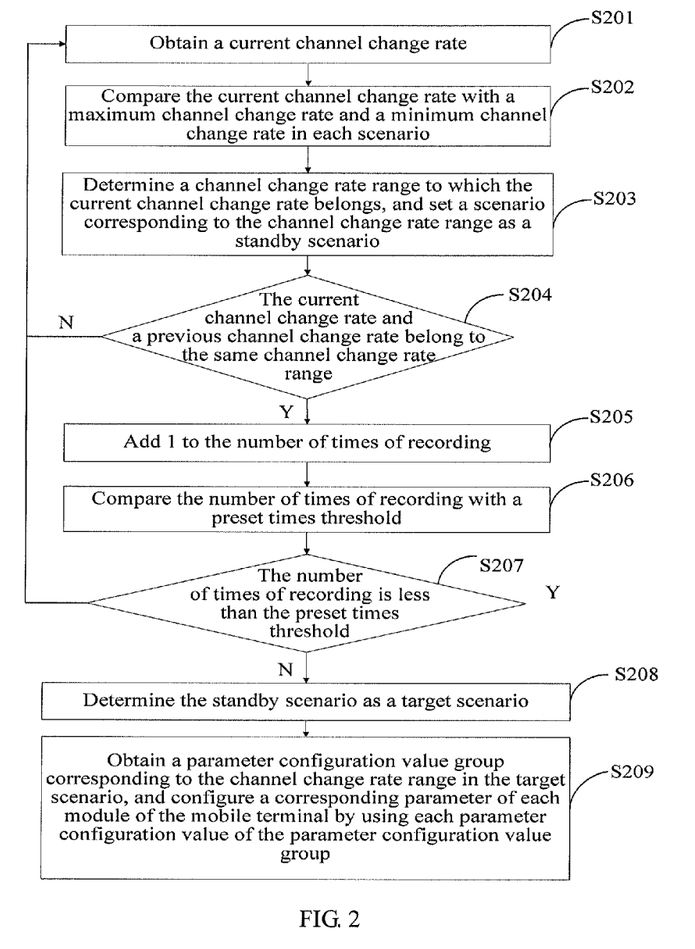
FIG. 2 is another flowchart of a parameter configuration method for a mobile terminal provided by an embodiment of the present invention.

In order to prevent parameter configuration from being switched back and forth when a mobile terminal is in different scenarios due to fluctuation of a channel change rate, a parameter configuration method for a mobile terminal provided by the embodiment of the present invention adopts multiple times of judgment, that is, when it is determined that the number of times that a current channel change rate and a previous channel change rate that is stored belong to the same channel change rate range is no less than a preset times threshold, the parameter configuration value group corresponding to a channel change rate range to which the current channel change rate belongs is obtained, and a corresponding parameter of each module of the mobile terminal is configured by using each parameter configuration value of the parameter configuration value group. That is to say, when the number of times that the current channel change rate and the previous channel change rate that is stored belongs to the same channel change rate range is no less than the preset times threshold, a scenario corresponding to the channel change rate range is set as a target scenario, and the corresponding parameter of each module of the mobile terminal is configured by using each parameter configuration value of the parameter configuration value group corresponding to the channel change rate range in the target scenario. The flowchart is shown in FIG. 2, which includes the following steps.

S201: Obtain a current channel change rate.

S202: Compare the current channel change rate with a maximum channel change rate and a minimum channel change rate in each scenario respectively.

The specific implementation processes of step S201 and step S202 are the same as those of step S101 and step S102 respectively, so details are not described herein again.

S203: Determine a channel change rate range to which the current channel change rate belongs, and set a scenario corresponding to the channel change rate range as a standby scenario.

As the maximum channel change rate of a static scenario may be equal to the minimum channel change rate of a low-speed scenario, and the maximum channel change rate of the low-speed scenario may be equal to the minimum channel change rate of the high-speed scenario, when step S203 is performed, the current channel change rate may belong to two channel change rate ranges at the same time. For example, the current channel change rate belongs to the channel change rate range of the static scenario and the channel change rate range of the low-speed scenario at the same time, and in this case, the channel change rate range to which the current channel change rate belongs is determined based on the principle of optimal performance, that is, it is determined that the current channel change rate belongs to the channel change rate of the low-speed scenario, and the low-speed scenario is set as the standby scenario, or the channel change rate range to which the current channel change rate belongs is determined based on the principle of minimum power consumption, that is, it is determined that the current channel change rate belongs to the channel change rate of the static scenario, and the static scenario is set as the standby scenario.

When the current channel change rate belongs to the channel change rate range of the low-speed scenario and the channel change rate range of the high-speed scenario at the same time, it is determined that the current channel change rate belongs to the channel change rate of the high-speed scenario based on the principle of optimal performance, and the high-speed scenario is set as the target scenario, or the channel change rate range to which the current channel change rate belongs is determined based on the principle of minimum power consumption, that is, it is determined that the current channel change rate belongs to the channel change rate of the low-speed scenario, and the low-speed scenario is set as the standby scenario.

S204: Judge whether the current channel change rate and the previous channel change rate that is stored belong to the same channel change rate range, and if the current channel change rate and the previous channel change rate that is stored belong to the same channel change rate range, S205 is performed; and if the current channel change rate and the previous channel change rate that is stored do not belong to the same channel change rate range, S201 is performed.

S205: Add 1 to the number of times of recording.

S206: Compare the number of times of recording with the preset times threshold.

S207: Judge whether the number of times of recording is less than the preset times threshold, and if the number of times of recording is not less than the preset times threshold, S208 is performed; and if the number of times of recording is less than the preset times threshold, S201 is performed again.

The reason for that the number of times of recording is required is that the channel change rate of the mobile terminal may transiently change, that is, the channel change rate at a certain moment in a certain period suddenly changes, so that the channel change rate range to which the channel change rate belongs changes, resulting in that a scenario in which the mobile terminal is changes and parameter configuration of each module in the mobile terminal is switched back and forth in different scenarios.

When the number of times of recording is no less than the preset times threshold, it indicates that the mobile terminal does not transiently change, and is in a target scenario, and at this time, parameter configuration of each module of the mobile terminal can be configured by using the parameter configuration value group in the target scenario. When the number of times of recording is less than the preset times threshold, it is required to further judge whether a next channel change rate and the current channel change rate belong to the same channel change rate range, so as to prevent the parameter configuration of the mobile terminal from being switched back and forth.

In the embodiment of the present invention, the preset times threshold may be set to be 5, and after the number of times of recording reaches the preset times threshold, the number of times of recording is cleared; or otherwise, when the next channel change rate and the current channel change rate do not belong to the same channel change rate range, step S208 and step S209 may still be performed, and a result that the parameter configuration of each module of the mobile terminal is switched between the high-speed scenario and the low-speed scenario back and forth may be caused. Definitely, the preset times threshold is different according to the classification of scenarios in different application environments.

S208: Determine the standby scenario as the target scenario.

S209: According to a corresponding relationship between a preset parameter configuration value group and the channel change rate range, obtain the parameter configuration value group corresponding to the channel change rate range in the target scenario, and configure a corresponding parameter of each module of the mobile terminal by using each parameter configuration value of the parameter configuration value group.

The parameter configuration method provided by the embodiment of the present invention may further obtain the parameter configuration value group of a current mobile terminal, and according to the corresponding relationship between the preset parameter configuration value group and the channel change rate range, obtain the channel change rate range corresponding to the parameter configuration value group of the current mobile terminal as a previous channel change rate range. The current channel change rate is compared with the previous channel change rate range. If the current channel change rate is located in the previous channel change rate range, it indicates that a scenario in which the mobile terminal is does not change, and parameter configuration of each module of the mobile terminal is reserved. If the current channel change rate is not located in the previous channel change rate range, it indicates that a scenario in which the mobile terminal is changes, and step S202 or step S209 is performed. By adopting the above solution, repeated configuration of each module in the mobile terminal can be further avoided when the scenario in which the mobile terminal is does not change.

Through the application of the above technical solutions, the corresponding parameter of each module of the mobile terminal is configured, baseband power consumption may be reduced, working time may be increased, and occurrence of risks in heat dissipation may be lowered, and at the same time, it is avoided that the parameter configuration of the mobile terminal is switched back and forth between the high-speed scenario and the low-speed scenario due to fluctuation of the channel change rate.

Figure 3:
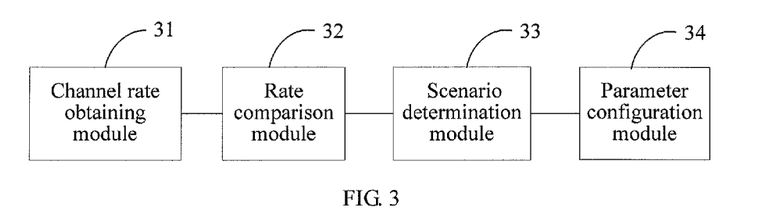
FIG. 3 is a schematic structural diagram of a parameter configuration device for a mobile terminal provided by an embodiment of the present invention.

Corresponding to the foregoing method embodiments, an embodiment of the present invention provides a parameter configuration device for a mobile terminal, and a schematic structural diagram is shown in FIG. 3. The device includes: a channel rate obtaining module 31, a rate comparison module 32, a scenario determination module 33, and a parameter configuration module 34.

The channel rate obtaining module 31 is configured to obtain a current channel change rate.

The channel rate obtaining module 31 obtaining the current channel change rate is: obtaining a movement speed of a current mobile terminal, and further obtaining the current channel change rate according to a proportional relationship between the movement speed and the channel change rate.

A speed estimation module is disposed in the mobile terminal, the speed estimation module obtains the current movement speed of the mobile terminal through an existing test method, for example, a signal processing method based on Doppler Effect or a GPS speed measurement method or a system power mode identification method, and details are not described in the embodiment of the present invention.

The rate comparison module 32 is configured to compare the current channel change rate with a channel change rate and a minimum channel change rate in each scenario respectively.

The scenario determination module 33 is configured to determine a channel change rate range to which the current channel change rate belongs, and set a scenario corresponding to the channel change rate range as a target scenario. As the maximum channel change rate of a static scenario may be equal to the minimum channel change rate of a low-speed scenario, and the maximum channel change rate of the low-speed scenario may be equal to the minimum channel change rate of a high-speed scenario, when the scenario determination module 33 determines a channel change rate range to which the current channel change rate belongs, the current channel change rate may belong to two channel change rate ranges at the same time. For example, the current channel change rate belongs to the channel change rate range of the static scenario and the channel change rate range of the low-speed scenario at the same time. In this case, the channel change rate range to which the current channel change rate belongs is determined based on the principle of optimal performance, that is, it is determined that the current channel change rate belongs to the channel change rate of the low-speed scenario, and the low-speed scenario is set as the target scenario, or the channel change rate range to which the current channel change rate belongs is determined based on the principle of minimum power consumption, that is, it is determined that the current channel change rate belongs to the channel change rate of the static scenario, and the static scenario is set as the target scenario.

When the current channel change rate belongs to the channel change rate range of the low-speed scenario and the channel change rate range of the high-speed scenario at the same time, it is determined that the current channel change rate belongs to the channel change rate of the high-speed scenario based on the principle of optimal performance, and the high-speed scenario is set as the target scenario, or the channel change rate range to which the current channel change rate belongs is determined based on the principle of minimum power consumption, that is, it is determined that the current channel change rate belongs to the channel change rate of the low-speed scenario, and the low-speed scenario is set as the target scenario.

Figure 4:
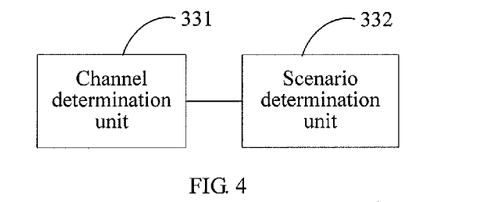
FIG. 4 is a schematic structural diagram of a scenario determination module in the parameter configuration device in FIG. 3.

The schematic structural diagram of the scenario determination module 33 is shown in FIG. 4, and the scenario determination module 33 includes a channel determination unit 331 and a scenario determination unit 332.

The channel determination unit 331 is configured to determine a channel change rate range to which the current channel change rate belongs.

The scenario determination unit 332 is configured to, when the current channel change rate belongs to two channel change rate ranges at the same time, select a scenario corresponding to one channel change rate range of the two channel change rate ranges as the target scenario based on the principle of optimal performance or the principle of minimum power consumption.

The parameter configuration module 34 is configured to, obtain the parameter configuration value group corresponding to the channel change rate range in the target scenario according to a corresponding relationship between the preset parameter configuration value group and the channel change rate range, and configure a corresponding parameter of each module of the mobile terminal by using each parameter configuration value of the parameter configuration value group.

However, the channel change rate of the mobile terminal may transiently change, that is, the channel change rate at a certain moment in a certain period suddenly changes, so that the channel change rate range to which the channel change rate belongs changes, resulting in that a scenario in which the mobile terminal is changes. At this time, if the parameter configuration value group corresponding to the channel change rate range is immediately used to perform parameter configuration for each module of the mobile terminal, it may result in that when a next channel change rate changes back to the channel change rate range that is before sudden change, the parameter configuration value group corresponding to the channel change rate range that is before the sudden change is used again to perform parameter configuration for each module of the mobile terminal, so that the parameter configuration of each module of the mobile terminal is switched back and forth in different scenarios.

Figure 5:
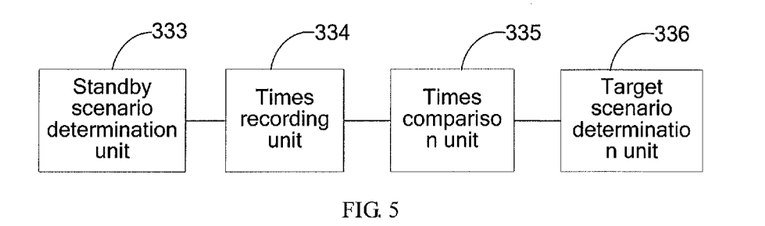
FIG. 5 is another schematic structural diagram of a scenario determination module in the parameter configuration device in FIG. 3.

In order to avoid the problem, it is required to further judge the number of times that the current channel change rate and a previous channel change rate that is stored belong to the same channel change rate range. Therefore, in the parameter configuration device for a mobile terminal provided by the embodiment of the present invention, the scenario determination module 33 includes: a standby scenario determination unit 333, a times recording unit 334, a times comparison unit 335, and a target scenario determination unit 336, and a schematic structural diagram of the scenario determination module 33 is shown in FIG. 5.

The standby scenario determination unit 333 is configured to determine a channel change rate range to which the current channel change rate belongs, and set a scenario corresponding to the channel change rate range as a standby scenario. The times recording unit 334 is configured to add 1 to the number of times of recording when the current channel change rate and the previous channel change rate that is stored belong to the same channel change rate range. The times comparison unit 335 is configured to compare with the number of times of recording with a preset times threshold. The target scenario determination unit 336 is configured to determine the standby scenario as the target scenario when the comparison result of the times comparison unit 335 is that the number of times of recording is no less than the preset times threshold. At this time, the parameter configuration module 34 obtains the parameter configuration value group corresponding to the channel change rate range in the target scenario according to the corresponding relationship between the preset parameter configuration value group and the channel change rate range, and configures the corresponding parameter of each module of the mobile terminal by using each parameter configuration value of the parameter configuration value group. When the comparison result of the times comparison unit 335 is that the number of times of recording is less than the preset times threshold, the channel rate obtaining module 31 further obtains a next channel change rate as the current channel change rate, and continuously controls the parameter configuration of the mobile terminal.

Figure 6:
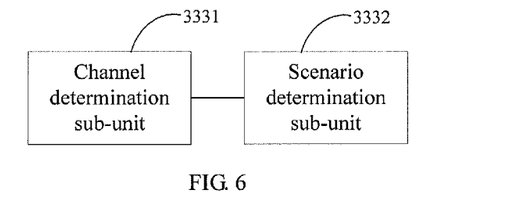
FIG. 6 is a schematic structural diagram of a standby scenario determination unit in the scenario determination module in FIG. 5.

Definitely, when the standby scenario determination unit 333 determines a standby scenario, a situation that the current channel change rate belongs to two channel change rate ranges at the same time exists, and at this time, the two channel change rate ranges to which the current channel change rate belongs are still determined based on the principle of optimal performance or the principle of minimum power consumption, and scenarios corresponding to the channel change rate ranges are set as standby scenarios. FIG. 6 is a schematic structural diagram of the standby scenario determination unit 333. The standby scenario determination unit 333 includes a channel determination sub-unit 3331 and a scenario determination sub-unit 3332.

The channel determination sub-unit 3331 is configured to determine a channel change rate range to which the current channel change rate belongs. The scenario determination sub-unit 3332 is configured to, when the current channel change rate belongs to two channel change rate ranges at the same time, select a scenario corresponding to one channel change rate range of the two channel change rate ranges as a standby scenario based on the principle of optimal performance or the principle of minimum power consumption.

The parameter configuration device provided by the embodiment of the present invention may further obtain the parameter configuration value group of a current mobile terminal, and according to a corresponding relationship between the preset parameter configuration value group and the channel change rate range, obtain a channel change rate range corresponding to the parameter configuration value group of the current mobile terminal as a previous channel change rate range. The current channel change rate is compared with the previous channel change rate range. If the current channel change rate is located in the previous channel change rate range, it indicates that a scenario in which the mobile terminal is does not change, and parameter configuration of each module of the mobile terminal is reserved. If the current channel change rate is not located in the previous channel change rate range, it indicates that a scenario in which the mobile terminal is changes. By adopting the above solution, repeated configuration of each module in the mobile terminal can be further avoided when the scenario in which the mobile terminal is does not change.

Figure 7:
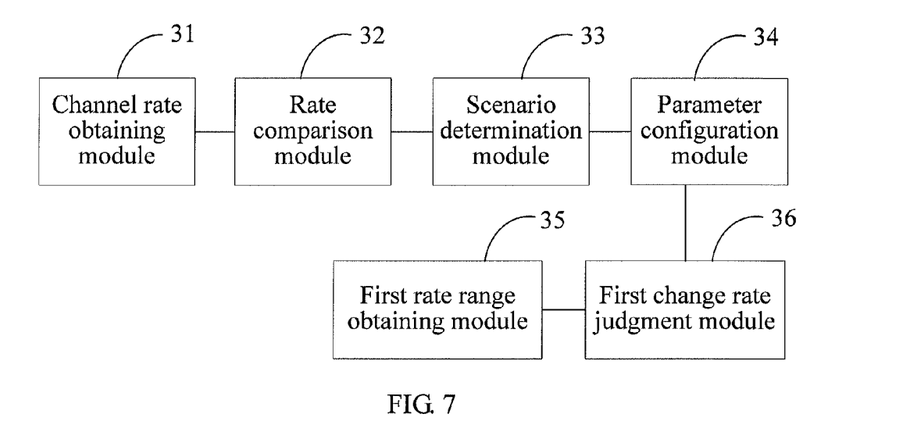
FIG. 7 is another schematic structural diagram of a parameter configuration device for a mobile terminal provided by an embodiment of the present invention.

In order to achieve the above objective, based on the parameter configuration device shown in FIG. 3, the parameter configuration device may further include: a first rate range obtaining module 35 and a first change rate judgment module 36, and a schematic structural diagram of the parameter configuration device is shown in FIG. 7.

The first rate range obtaining module 35 is configured to obtain the parameter configuration value group of the current mobile terminal, and according to the corresponding relationship between the preset parameter configuration value group and the channel change rate range, obtain a channel change rate range corresponding to the parameter configuration value group of the current mobile terminal as a previous channel change rate range.

The first change rate judgment module 36 is configured to judge whether the current channel change rate is located in the previous channel change rate range; when it is judged that the current channel change rate is not located in the previous channel change rate range, the parameter configuration module 34 obtains the parameter configuration value group corresponding to the channel change rate range in the target scenario according to the corresponding relationship between the preset parameter configuration value group and the channel change rate range, and configures the corresponding parameter of each module of the mobile terminal by using each parameter configuration value of the parameter configuration value group, or the parameter configuration module 34 obtains the parameter configuration value group corresponding to the channel change rate range in the target scenario according to the corresponding relationship between the preset parameter configuration value group and the channel change rate range, and configures the corresponding parameter of each module of the mobile terminal by using each parameter configuration value of the parameter configuration value group; and when it is judged that the current channel change rate is located in the previous channel change rate range, parameter configuration of each module of the mobile terminal is reserved.

Through application of the technical solutions, compared with the prior art that the corresponding parameter of each module of the mobile terminal is configured by using the parameter configuration value group corresponding to a channel change rate range in a high-speed scenario, baseband power consumption is reduced, working time is increased, and occurrence of risks in heat dissipation is lowered. It is verified by the inventor through multiple experiments that, when each module of the mobile terminal is configured by adopting the above device, in a low-speed scenario, the equalized power consumption of key modules of the mobile terminal, for example, an equalization and demodulation module and an adjacent cell interference cancellation module can be at least reduced by 60%, and overall baseband power consumption can be at least reduced by 5%.

Additionally, a situation that parameter configuration is switched back and forth when the mobile terminal is in the high-speed scenario and the low-speed scenario due to fluctuation of the channel change rate and that the parameter configuration of the mobile terminal in the high-speed scenario is repeatedly configured can be avoided.

It should be noted that, relationship terms herein such as first and second are only used to distinguish one entity or operation from another entity or operation, while any practical relationship or sequence among these entities or operations is unnecessarily required or implied. Furthermore, terms "include", "contain" or any other variants are intended to cover nonexclusive inclusion, so that a procedure, a method, an article or a device including a series of elements not only includes those elements, but also includes other elements that are not explicitly listed, or includes inherent elements of the procedure, the method, the article or the device. In a case of no more limitations, elements limited by a sentence of "includes one" do not exclude that other same elements further exist in the procedure, the method, the article or the equipment including the elements.

All embodiments in the present specification adopt an incremental manner for description. Each embodiment focuses on the difference from other embodiments, and the same or similar parts of the embodiments may be referred to each other. Through the description of the method embodiments, it is clear to persons skilled in the art that the present invention may be accomplished through hardware, or through software plus a necessary universal hardware platform. However, in many cases, the software implementation is preferred. Therefore, the technical solution of the present invention or the part that makes contributions to the prior art can be substantially embodied in the form of a software product. The computer software product is stored in a storage medium, and contains several instructions to instruct computer equipment (such as, a personal computer, a server, or network equipment) to perform all or part of steps of the method as described in the embodiments of the present invention. The storage medium may be any medium that is capable of storing program codes, such as a read-only memory (ROM), a random access memory (RAM), a magnetic disk, and an optical disk.

As the device embodiments are substantially corresponding to the method embodiments, as for the relevant description, reference can be made to the description for the method embodiments. The apparatus embodiments are merely exemplary. Units described as separate components may be or may not be physically separated. Components shown as units may be or may not be physical units, that is, may be integrated or distributed to a number of network units. Some or all of the modules may be selected to achieve the objective of the solutions of the embodiments according to actual requirements. Persons of ordinary skill in the art can understand and implement the present invention without creative efforts.

In several embodiments provided in the present application, it should be understood that the disclosed device and method may be implemented in other ways without departing from the spirit and the scope of the present invention. The current embodiments are merely exemplary examples instead of being limitative, and the specific content provided thereby should not limit the objective of the application. For example, the division of modules or sub-modules is merely a logic function division, and other division manners may exist in actual implementation, for example, multiple modules or multiple sub-modules are combined together. Furthermore, multiple modules or assemblies may be combined or integrated in another system, or some features may be ignored or may not be performed.

The above description is about exemplary embodiments of the present invention. It should be noted that modifications and variations may be made by persons of ordinary skill in the art without departing from the principle of the present invention, and such modifications and variations should be construed as falling within the protection scope of the present invention.

The invention claimed is:

1. A parameter configuration method for a mobile terminal, the method implemented by a mobile terminal, the method comprising:
obtaining a current channel change rate based on a current movement speed of the mobile terminal wherein the current movement speed is in a proportional relationship to the current channel change rate;

determining whether the current channel change rate is located in a previous channel change rate range;

when determined that the current channel change rate is not located in the previous channel change rate range, executing the following steps:

comparing the current channel change rate with a maximum channel change rate and a minimum channel change rate in each scenario respectively;

determining a channel change rate range to which the current channel change rate belongs, and setting a scenario corresponding to the channel change rate range as a target scenario;

setting the scenario corresponding to the channel change rate range as a standby scenario;

when the current channel change rate and a previous channel change rate that is stored belong to a same channel change rate range, adding 1 to a number of times of recording;

comparing the number of times of recording with a preset times threshold; and when the number of times of recording is no less than the preset times threshold, determining the standby scenario as the target scenario; and according to a corresponding relationship between a preset parameter configuration value group and the channel change rate range, obtaining the parameter configuration value group corresponding to the channel change rate range in the target scenario, and configuring a corresponding parameter of each module of the mobile terminal by using each parameter configuration value of the parameter configuration value group.

2. The parameter configuration method according to claim 1, wherein the determining the channel change rate range to which the current channel change rate belongs, and setting the scenario corresponding to the channel change rate range as the target scenario comprises:

determining the channel change rate range to which the current channel change rate belongs;

when the current channel change rate belongs to two channel change rate ranges at the same time, selecting the scenario corresponding to one channel change rate range of the two channel change rate ranges as the target scenario based on a principle of optimal performance or a principle of minimum power consumption.

3. The parameter configuration method according to claim 1, wherein the determining the channel change rate range to which the current channel change rate belongs, and setting the scenario corresponding to the channel change rate range as the standby scenario comprises:

determining the channel change rate range to which the current channel change rate belongs; and when the current channel change rate belongs to two channel change rate ranges at the same time, selecting the scenario corresponding to one channel change rate range of the two channel change rate ranges as the standby scenario based on a principle of performance precedence.

4. The parameter configuration method according to claim 1, further comprising:

when determined that the current channel change rate is located in the previous channel change rate range, reserving parameter configuration of each module of the mobile terminal.

5. A mobile terminal comprising a non-volatile memory, the non-volatile memory comprising instructions for a channel rate obtaining module, configured to obtain a current channel change rate based on a current movement speed of the mobile terminal wherein the current movement speed is in a proportional relationship to the current channel change rate;

a rate comparison module, configured to compare the current channel change rate with a channel change rate and a minimum channel change rate in each scenario respectively;

a scenario determination module, configured to determine a channel change rate range to which the current channel change rate belongs, and set a scenario corresponding to the channel change rate range as a target scenario, wherein the scenario determination module comprises:

a standby scenario determination unit, a times recording unit, a times comparison unit, and a target scenario determination unit, wherein:

the standby scenario determination unit is configured to determine the channel change rate range to which the current channel change rate belongs, and set the scenario corresponding to the channel change rate range as a standby scenario;

the times recording unit is configured to, when the current channel change rate and a previous channel change rate that is stored belong to a same channel change rate range, add 1 to a number of times of recording;

the times recording unit is configured to compare the number of times of recording with a preset times threshold; and the target scenario determination unit is configured to, when a comparison result of the times comparison unit is that the number of times of recording is no less than the preset times threshold, determine the standby scenario as the target scenario;

a parameter configuration module, configured to obtain a parameter configuration value group corresponding to the channel change rate range in the target scenario according to a corresponding relationship between the parameter configuration value group preset and the channel change rate range, and configure a corresponding parameter of each module of the mobile terminal by using each parameter configuration value of the parameter configuration value group; and a first change rate judgment module, configured to determine whether the current channel change rate is located in a previous channel change rate range, wherein the first change rate judgment module in response to determining that the current channel change rate is not located in the previous channel change rate range causes the rate comparison module to perform the steps of comparing the current channel change rate with the channel change rate and the minimum channel change rate in each scenario respectively.

6. The parameter configuration device according to claim 5, wherein the scenario determination module comprises: a channel determination unit and a scenario determination unit, wherein:

the channel determination unit is configured to determine the channel change rate range to which the current channel change rate belongs; and the scenario determination unit is configured to, when the current channel change rate belongs to two channel change rate ranges at the same time, select the scenario corresponding to one channel change rate range of the two channel change rate ranges as the target scenario based on a principle of optimal performance or a principle of minimum power consumption.

7. The parameter configuration device according to claim 5, wherein the standby scenario determination unit comprises: a channel determination sub-unit and a scenario determination sub-unit, wherein:
  the channel determination sub-unit is configured to determine the channel change rate range to which the current channel change rate belongs; and
  the scenario determination sub-unit is configured to, when the current channel change rate belongs to two channel change rate ranges at the same time, select the scenario corresponding to one channel change rate range of the two channel change rate ranges as the standby scenario based on a principle of performance precedence.

8. The parameter configuration device according to claim 5, further comprising:
  a first rate range obtaining module, configured to obtain a parameter configuration value group of a current mobile terminal, and according to the corresponding relationship between the preset parameter configuration value group and the channel change rate range, obtain a channel change rate range corresponding to the parameter configuration value group of the current mobile terminal as a previous channel change rate range.

* * * * *